(12) United States Patent
Wood

(10) Patent No.: US 8,628,387 B2
(45) Date of Patent: *Jan. 14, 2014

(54) BIRD DEBREASTING TOOL AND METHODS

(71) Applicant: O'Neal Wood, Golden, MS (US)

(72) Inventor: O'Neal Wood, Golden, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,037

(22) Filed: Dec. 31, 2012

(65) Prior Publication Data

US 2013/0122793 A1    May 16, 2013

Related U.S. Application Data

(63) Continuation-in-part of application No. 13/217,960, filed on Aug. 25, 2011, now Pat. No. 8,342,918.

(60) Provisional application No. 61/377,905, filed on Aug. 27, 2010.

(51) Int. Cl.
   *A22C 17/00*    (2006.01)

(52) U.S. Cl.
   USPC ............................................. 452/137

(58) Field of Classification Search
   USPC ..................... 452/103, 185, 102, 105, 187
   See application file for complete search history.

(56) References Cited

U.S. PATENT DOCUMENTS

| | | | | |
|---|---|---|---|---|
| 606,123 | A * | 6/1898 | Coates | 30/120 |
| 1,374,819 | A * | 4/1921 | Byer | 30/226 |
| 2,298,580 | A * | 10/1942 | Miron | 452/185 |
| 2,587,007 | A * | 2/1952 | Southward et al. | 452/185 |
| 2,603,829 | A * | 7/1952 | Siskoff | 452/185 |
| 2,737,718 | A * | 3/1956 | Maunu | 30/226 |
| 2,785,436 | A * | 3/1957 | Noland et al. | 452/185 |
| 2,834,981 | A * | 5/1958 | Willis | 452/185 |
| 2,863,165 | A * | 12/1958 | Hartman | 452/185 |
| 2,891,275 | A * | 6/1959 | Schuls | 452/185 |
| D251,232 | S * | 3/1979 | Yamamoto | D8/5 |
| 5,463,814 | A * | 11/1995 | Stowell et al. | 30/232 |
| 6,602,124 | B2 * | 8/2003 | Miller | 452/185 |
| 7,032,316 | B1 * | 4/2006 | Tseng | 30/226 |

* cited by examiner

*Primary Examiner* — Richard Price, Jr.
(74) *Attorney, Agent, or Firm* — Waddey Patterson, PC; Matthew C. Cox

(57) ABSTRACT

An apparatus for removing a breast from a game bird provides first and second blades pivotally attached to a stabilizer bar projecting outwardly between the first and second blades. The stabilizer bar is generally adapted for insertion into the abdomen of a bird, and the first and second blades can be actuated using one or more handles to create a scissoring effect whereby a region of the abdomen, or the breast, is severed from the bird. Methods of removing a breast from a bird are also disclosed.

13 Claims, 20 Drawing Sheets

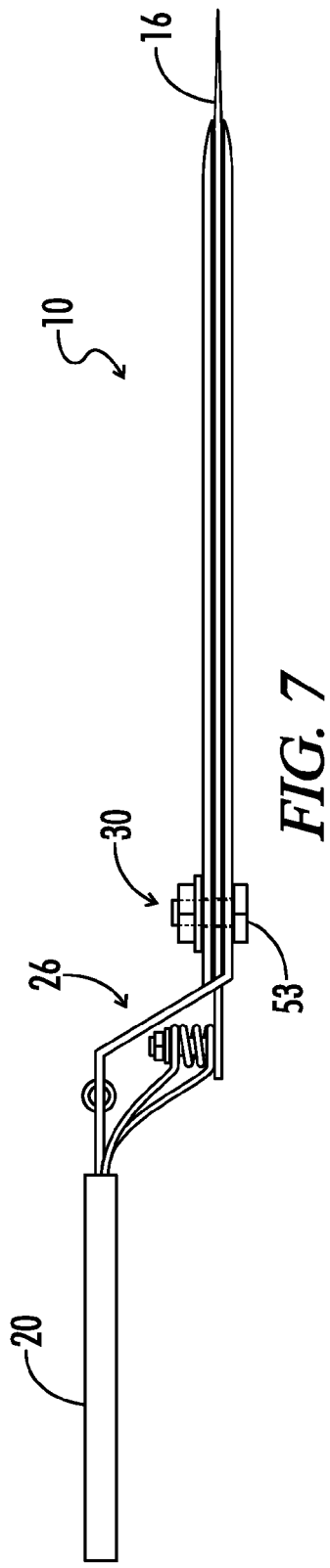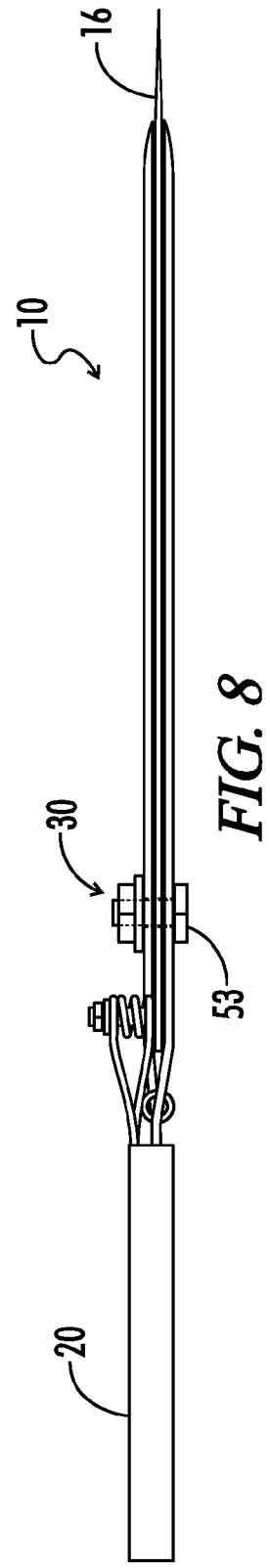

BIRD DEBREASTING TOOL AND METHODS

CROSS-REFERENCES TO RELATED APPLICATIONS

This application claims benefit to U.S. provisional patent application Ser. No. 61/377,905 filed Aug. 27, 2010 titled "IMPROVED FOWL DEBREASTING TOOL AND METHODS THEREFOR" and also claims benefit under 35 U.S.C. §120 as a continuation-in-part of co-pending U.S. nonprovisional patent application Ser. No. 13/217,960 filed Aug. 25, 2011 titled "BIRD DEBREASTING TOOL AND METHODS," both of which are hereby incorporated by reference in their entireties.

BACKGROUND

1. Technical Field

The present disclosure relates generally to cutting tools and more particularly to handheld machinery and methods for debreasting a game bird.

2. Background Art

Conventional knives and bladed instruments for cutting and shearing meat from game animals are known in the art. Such instruments include single bladed knives having one or more sharpened edges for cutting game meat. Some conventional edged instruments known in the art for removing meat from game animals include blades having unique geometric shapes designed for optimal meat removal. Other devices known in the art include conventional hunting and kitchen knives.

In many applications, it is generally desirable to remove only the breast from a game bird. For example, when a species of game bird such as dove, duck, quail, pheasant, grouse, woodcock, partridge, etc. is harvested, a significant portion of the desirable meat for human consumption is found in the breast region on the underside of the bird abdomen. Sportsmen and sportswomen often prefer to remove and keep only the intact breast region of a bird and discard the remainder of the carcass. The breast region typically is removed using a knife or other type of cutting instrument. In many applications, however, a conventional knife or other cutting instrument does not provide an optimal breast removal tool for cleaning wild fowl. For example, a knife may slip in the user's hand or may inadvertently pierce entirely through the bird abdomen and cause injury the user. Moreover, the cleaning process using a handheld knife is slow. In many situations, a single hunter or group of hunters may harvest several dozen birds, which can require multiple hours to clean using conventional tools and methods. Additionally, conventional tools and methods do not efficiently remove the maximum amount of consumable breast meat, and thus result in waste.

Others have attempted to improve upon conventional handheld tools and methods for cleaning game bird by providing game shears, or scissors, for removing meat. Such conventional game shears typically include opposing blades connected at a pivoting joint. However, such conventional game shears are difficult to use in many applications because the bird abdomen may inadvertently move, or slip, between the blades during use. Additionally, conventional game shears do not rigidly hold the abdomen in place as the opposing blades approach from the sides, allowing slippage of the bird and causing damage to the breast meat and potential injury to the user, and further resulting in inefficient meat removal.

What is needed are improvements in the devices and methods for removing meat from a game animal, and particularly for debreasting a game bird.

BRIEF SUMMARY

One object of the present disclosure is to provide a tool for removing meat from an animal.

Another object of some embodiments of the present disclosure is to provide a tool for debreasting, or removing the breast meat from the abdomen of, a game bird.

Yet another object of some embodiments of the present disclosure is to provide a tool for quickly removing the breast meat and attached keel bone of a game bird.

A further object of some embodiments of the present disclosure is to provide a tool for quickly separating and removing the breast meat of a game bird from the keel bone, thereby providing a boneless filet of game bird breast meat.

Yet another object of some embodiments of the present disclosure is to provide a tool that can interchangeably be used to either remove the breast meat and attached keel bone from the abdomen of a game bird, or separate and remove the breast meat from the keel bone of a game bird, thereby providing a boneless fillet of game bird breast meat.

A further object of the present disclosure is to provide a tool that can hold a game bird relatively stationary while simultaneously cutting the breast from the body of the game bird using at least two cutting blades for quickly removing the breast meat.

Yet another object of the present disclosure is to provide a method of removing meat from a game bird using a tool having a stabilizer bar and at least two blades pivotally attached to the stabilizer bar.

A further object of the present disclosure is to provide a method for quickly removing the breast of a dove or a duck.

Yet another object of the present disclosure is to provide a method of using a tool having at least three blades to quickly remove the breast meat of a dove or a duck.

Numerous other objects, features and advantages of the present disclosure will be readily apparent to those of skill in the art upon a reading of the following disclosure when taken in conjunction with the accompanying drawings.

BRIEF DESCRIPTION OF THE DRAWINGS

FIG. 7 illustrates a side elevation view of one embodiment of a game meat removal tool in accordance with the present disclosure FIG. 8 illustrates a side elevation view of one embodiment of a game meat removal tool in accordance with the present disclosure.

DETAILED DESCRIPTION

Figure 1:
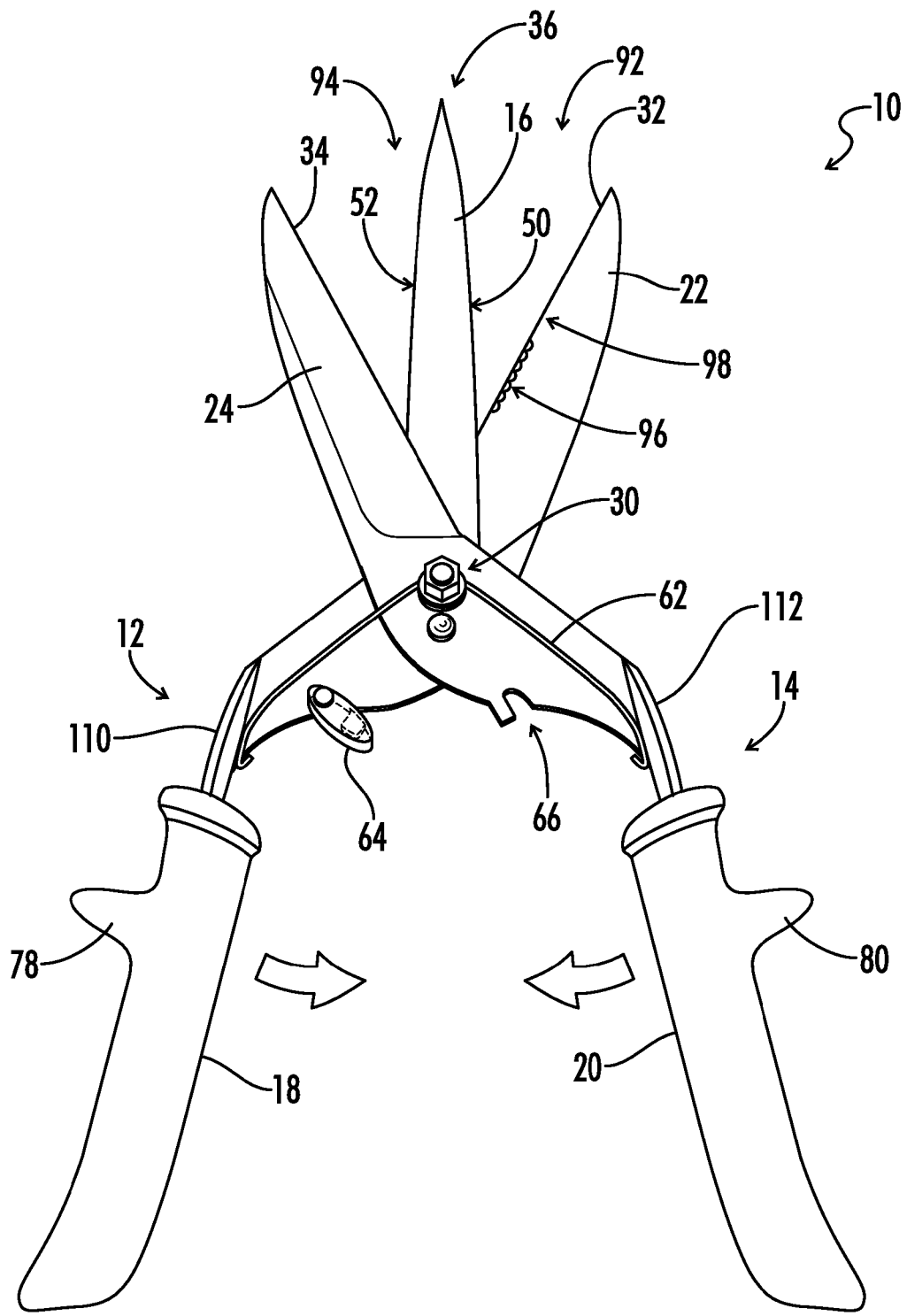
FIG. 1 illustrates a plan view of one embodiment of a game meat removal tool in an open position in accordance with the present disclosure.

Referring now to the drawings, one embodiment of the present disclosure provides a meat removal tool, illustrated generally in FIG. 1 and designated by the numeral 10. It is understood that in the drawings, not all reference numbers are included in each drawing, for the sake of clarity. In addition, positional terms such as a "upper," "lower," "side," "top," "bottom," "vertical," "horizontal," etc. refer to the apparatus when in the orientation shown in the drawing. The skilled artisan will recognize that objects in accordance with the present disclosure can assume different orientations when in use.

Referring to FIG. 1, one embodiment of an apparatus for removing breast meat from a bird, or a meat removal tool 10 in accordance with the present disclosure is illustrated generally in an open position. Meat removal tool 10 defines a first opening 92 and a second opening 94. As seen in an exploded view in FIG. 3, the tool 10 generally includes a first member 12, a second member 14 and a third, or center, member 16. The first and second members 12, 14 are generally pivotally attached at a pivoting joint 30, seen in FIG. 1.

First member 12 includes a first handle 18, and second member 14 includes a second handle 20. The first handle 18 can be integrally formed on first member 12, and the second handle 20 can be integrally formed on second member 14 in some embodiments. In other embodiments, first handle 18 includes a separate part that is installed onto first member 12, and second handle 20 includes a separate part that is installed onto second member 14. The first and second handles 18, 20 in some embodiments comprise a plastic material such as but not limited to nylon, polypropylene, polyethylene, acrylonitrile butadiene styrene (ABS), polystyrene, polyamides, rubber, etc. First and second handles 18, 20 include a textured surface in some embodiments to improve grip in cold or wet conditions. In some embodiments, the first and second handles 18, 20 include a camouflage pattern or other colored pattern to improve or to reduce visibility.

Figure 14:
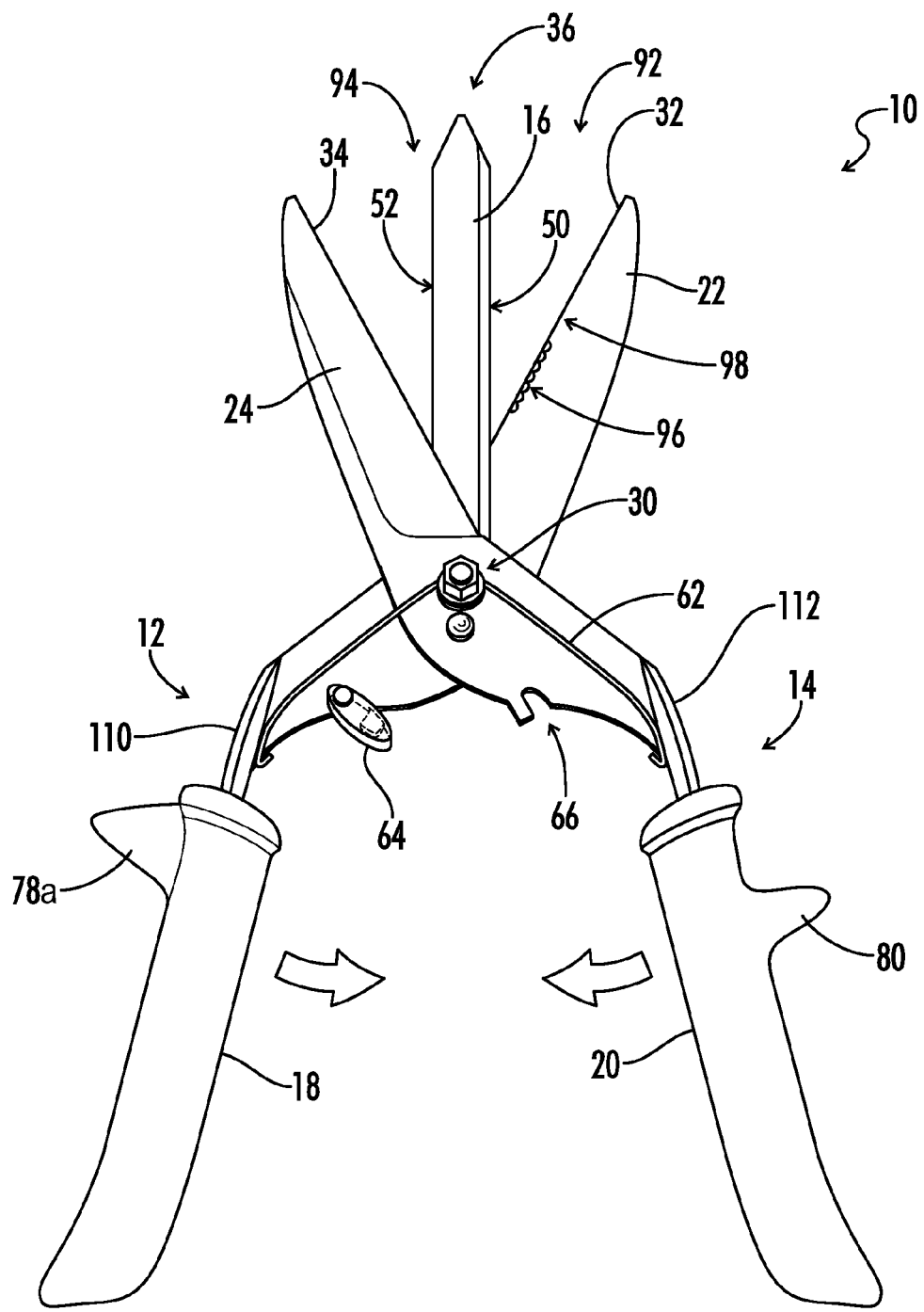
FIG. 14 illustrates an embodiment of a tool for removing a breast from a game bird, the tool having asymmetric handles.

As seen in FIG. 1, the first handle 18 in some embodiments includes a first handle flange 78 protruding outward from the first handle, and the second handle 20 includes a second handle flange 80 protruding outward from the second handle. The first and second handle flanges 78, 80 provide an extended surface against which a user may apply an axial, or longitudinal, force for driving one or more of the members into a game animal when the tool 10 is in the open position. In one embodiment, the first and second handle flanges 78, 80 protrude outward at an approximately ninety degree angle to each respective handle 12, 14. In some embodiments, the first and second handles 18, 20 are detachable from the respective first and second members 12, 14 on which they are installed and can be removed for cleaning. In some embodiments, the first and second handles are dishwasher-safe for cleaning in a dishwasher to remove blood following use. As seen in FIG. 1, first and second handles 18, 20 may include identical pieces. In other embodiments, as seen in FIG. 14, the first handle flange 78a may be located closer to stabilizer bar 16 than second handle flange 80. As such, first handle flange 78 is configured to engage a user's thumb or a region of a user's hand between the index finger and thumb, while the second handle flange is configured to engage the index finger or a portion of a user's hand between the index finger and the middle finger. As such, a user may be able to more easily exert required force on the handles to cut through the bones connecting the breast of a game bird to the bird's body. Also seen in FIG. 14, in some embodiments, first bar edge 50 is sharpened and is beveled toward first blade 22. Similarly, second bar edge 52 may be sharpened and beveled toward second blade 24. Additionally, in some embodiments, stabilizer bar 16 includes a distal end 36 that forms an angle with first and second bar edges.

Each first and second member 12, 14 also include a corresponding blade. First member 12 includes a first blade 22. First blade 22 includes a first blade edge 32, as illustrated generally in FIG. 1. First blade edge 32 can be sharpened for improved cutting performance. Similarly, second member 14 includes a second blade 24. Second blade 24 includes a second blade edge 34. Second blade edge 34 can be sharpened for cutting meat. Each of first and second blade edges 32, 34 can include a smooth or serrated sharpened edge. In some embodiments, one or both edges 32, 34 can include both a smooth sharpened region 98 and a serrated sharpened region 96, as illustrated in FIG. 1. Each serrated region can improve cutting performance through muscle ligaments or through cartilage or bone that connects the breast to the bird.

Also seen in FIG. 1, a stabilizer bar 16, or center member, protrudes from the pivoting joint 30 between first and second blades 22, 24. Stabilizer bar 16 includes a base and a distal end, or stabilizer bar point 36, extending from the base. The stabilizer bar is shaped for insertion into an abdomen of a game bird. Stabilizer bar 16 generally includes a first bar edge 50 facing first blade 22 and a second bar edge 52 facing second blade 24. During use, first and second blades 22, 24 generally move toward stabilizer bar 16 when first and second handles 18, 20 are moved toward each other, causing first and second members 12, 14 to pivot about pivoting joint 30. In some embodiments, first and second bar edges 50, 52 are fully or partially sharpened for providing a cutting interaction with corresponding first and second blade edges 32, 34. In some embodiments, first and/or second bar edges 50, 52 can be unsharpened and can provide an edge against which each respective first and second blade 22, 24 is passed for cutting meat from the game bird. In further embodiments, first and/or second bar edges 50, 52 can be fully or partially serrated for improving cutting performance or for stabilizing the bird to be cut on stabilizer bar 16. Thus, in some embodiments, the stabilizer bar 16 serves as a blade, including sharpened bar edges 50, 52. In additional configurations, stabilizer bar 16 provides a support for securing a fowl body to be debreasted between first and second blades 22, 24.

Figure 2:
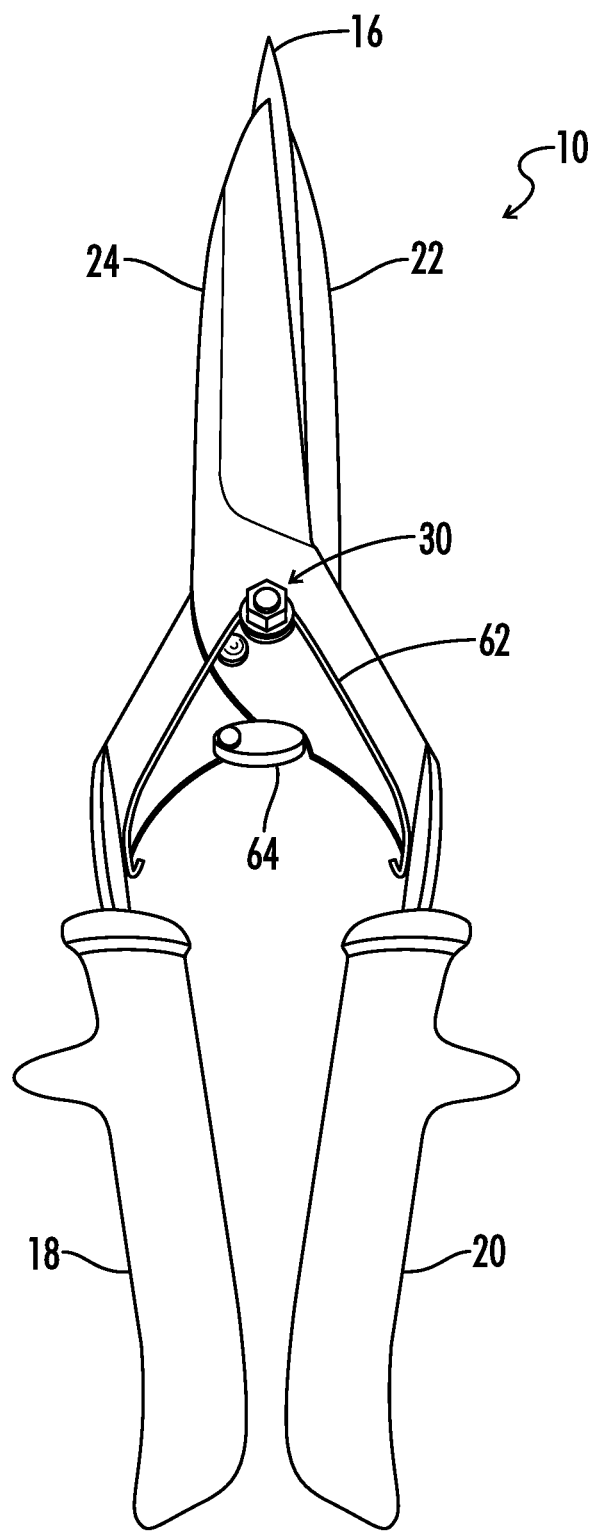
FIG. 2 illustrates a plan view of one embodiment of a game meat removal tool in a closed position in accordance with the present disclosure.

Also seen in FIG. 1, a latch 64 can be disposed on first member 12. A notch 66 is defined in second member 14. Latch 64 can generally rotate toward notch 66 when tool 10 is in the closed position, as seen in FIG. 2. Latch 64 generally engages notch 66 to releasably secure the tool 10 in the closed position. It is understood that in accordance with the present disclosure, in other embodiments, latch 64 can be positioned on second member 14 and notch 66 can be positioned on first member 12.

Referring further to FIG. 1, in some embodiments, a spring 62 is positioned between first and second blades. Spring 62 can include a torsion spring in some embodiments and may be positioned on tool 10 for biasing the tool 10 in the open position. Spring 62 can in some embodiments include a coil that is aligned with pivoting joint 30. As seen in FIG. 1, in some embodiments, first member 12 includes a first blade 22 and a first member flange 110 attached to first blade 22. First member flange 110 generally includes a structure oriented at an angle to the plane of first blade 22. In some embodiments, spring 62 includes a first spring arm that engages first member flange. As such, first spring 62 exerts an outward force on first member flange 110 for biasing first member in an open position, as seen in FIG. 1. Similarly, second member 14 includes a second blade 24 and a second member flange 112 attached to second blade 24. Second member flange 112 generally includes a structure oriented at an angle to the plane of second blade 24. In some embodiments, spring 62 includes a second spring arm that engages second member flange 112 for biasing second member in an open position, as seen in FIG. 1. In other embodiments, first spring arm may engage another structure on first member 12, and/or second spring arm may engage another structure on second member 14, for biasing first and second members in an open position.

Figure 3:
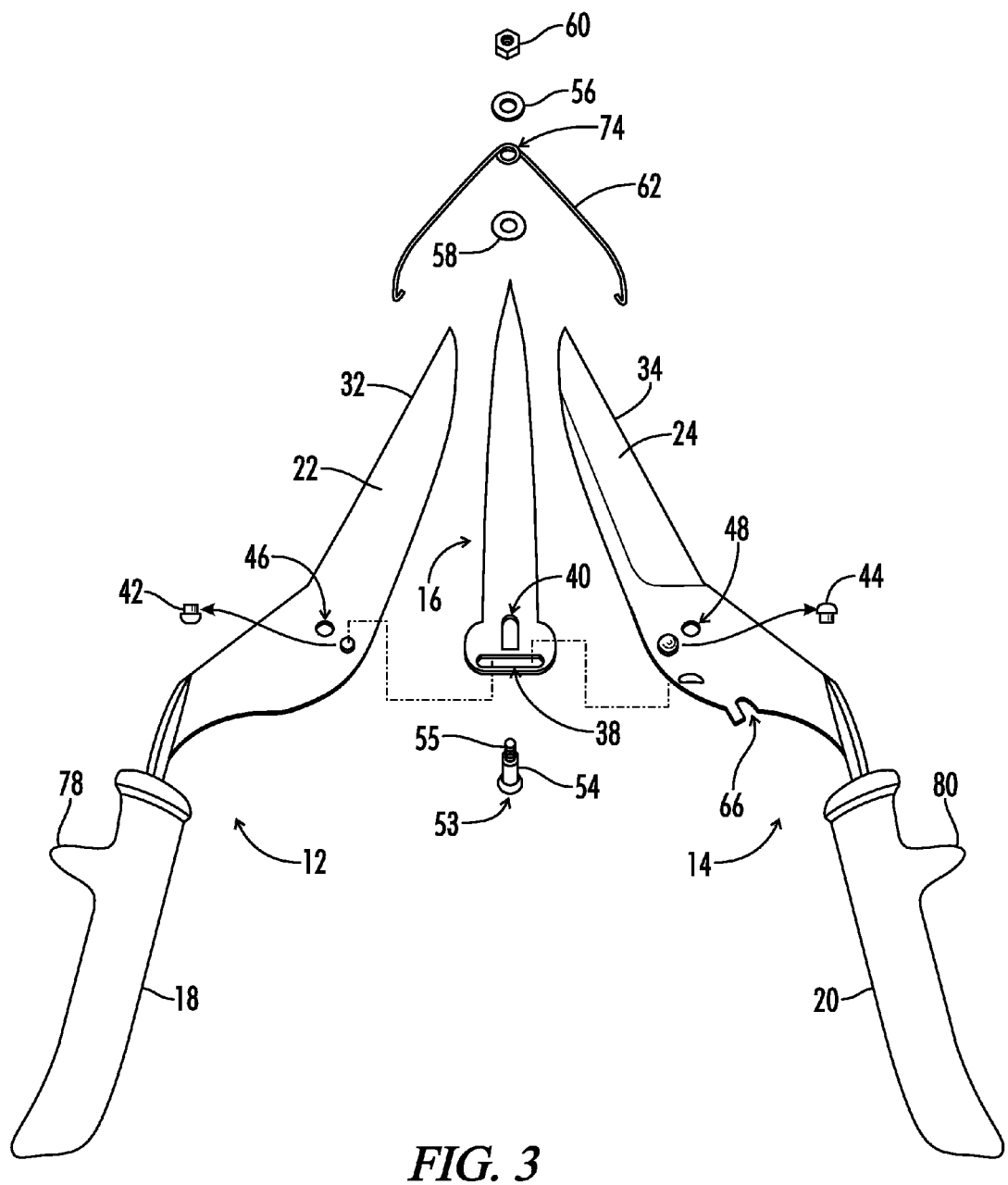
FIG. 3 illustrates an exploded view of one embodiment of a game meat removal tool having a stabilizer bar in accordance with the present disclosure.

Referring further to FIG. 3, stabilizer bar 16 in some embodiments defines a bar fastener slot 40. Additionally, first blade 22 includes a first clearance hole 46, and second blade 24 includes a second clearance hole 48. First and second member clearance holes 46, 48 and bar fastener slot 40 can be axially aligned when tool 10 is fully assembled. In some embodiments a fastener 53 can be inserted through each of first and second clearance holes 46, 48 and through bar fastener slot 40 to pivotally join first and second members 12, 14 to stabilizer bar 16. In some embodiments, bar fastener slot 40 defines a larger void area than the cross sectional profile of fastener 53, allowing fastener 53 to translate in one or two dimensions, or in the plane of stabilizer bar 16, when positioned in bar fastener slot 40. In some embodiments, as seen in FIG. 3, fastener 53 includes a threaded region 55 and a smooth region 54. The threaded region 55 generally engages a threaded fastener nut 60. In some embodiments, spring 62 includes a spring aperture 74 aligned with and disposed about fastener 53. Spring aperture 74 generally includes an inner diameter greater than the outer diameter of fastener 53. In some embodiments, first and second washers 56, 58 are disposed on fastener 53 on either side of spring aperture 74. In some embodiments, first washer 56 is positioned between fastener nut 60 and spring 62, and second washer 58 is positioned between spring 62 and second blade 24.

Also seen in FIG. 3, first member 12 generally includes in some embodiments a first travel pin 42 protruding from first blade 22 generally toward stabilizer bar 16. First travel pin 42 slidably engages a bar travel slot 38 defined in the base of stabilizer bar 16. Bar travel slot 38 is oriented substantially transverse to the longitudinal axis of stabilizer bar 16 in some embodiments. Thus, when first blade 12 pivots about fastener 53, first travel pin 42 slidably translates through bar travel slot 38. Similarly, in some embodiments, second blade 24 includes a second travel pin 44 protruding from second blade 24 toward stabilizer bar 16. Second travel pin 44 slidably engages bar travel slot 38 when second blade 14 is pivoted about fastener 53 relative to stabilizer bar 16. First and second travel pins 42, 44 in some embodiments effectively allow pivoting of first and second blades 22, 24 relative to stabilizer bar 16 while keeping stabilizer bar 16 angularly equidistant from first and second blade edges 32, 34.

In some applications, tool 10 can be used to quickly remove the breast from a bird. More particularly, tool 10 is adapted to quickly and efficiently cut meat from the abdomen of wild game birds, for example but not limited to ducks, dove, quail, pheasant, grouse, geese, etc. In some additional embodiments, it is understood that tool 10 of the present disclosure is adaptable for removing meat from the abdomen of domesticated or pen-raised birds such as chickens. Further, the present disclosure could alternately be used for cutting objects in other applications where it is desirable to keep the object to be cut stationary relative to blades approaching from the side.

Figure 9:
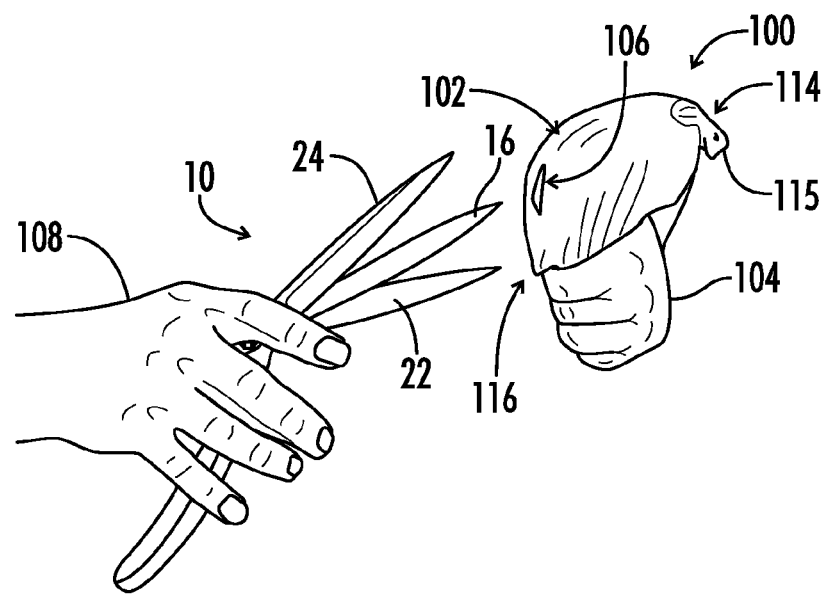
FIG. 9 illustrates an exemplary embodiment of one step of a method of using a game meat removal tool to remove meat from a game animal in accordance with the present disclosure.
Figure 10:
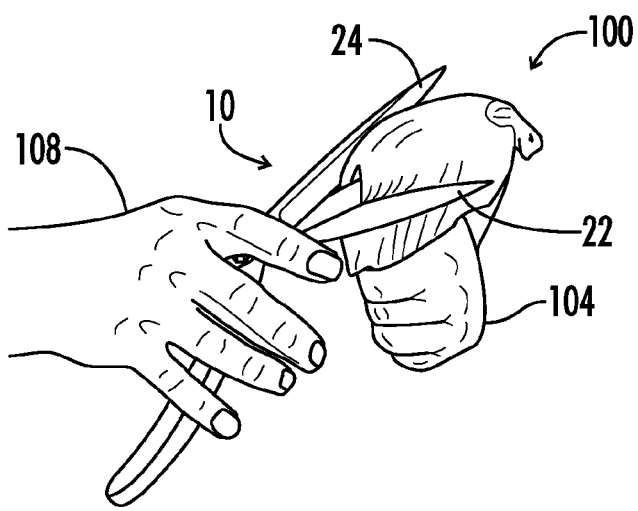
FIG. 10 illustrates an exemplary embodiment of one step of a method of using a game meat removal tool to remove meat from a game animal in accordance with the present disclosure.
Figure 11:
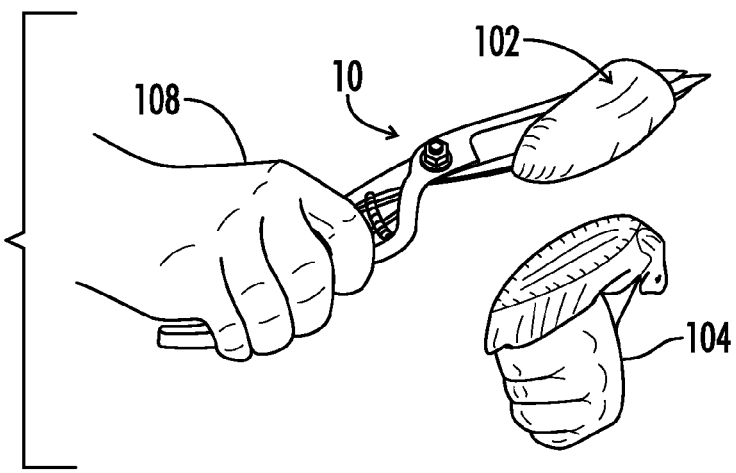
FIG. 11 illustrates an exemplary embodiment of one step of a method of using a game meat removal tool to remove meat from a game animal in accordance with the present disclosure.
Figure 12A:
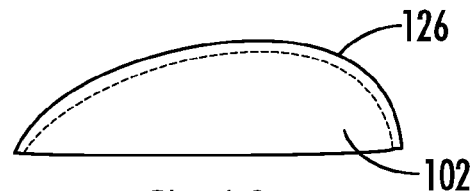
FIGS. 12A-12E illustrate collectively an exemplary embodiment of multiple steps of peeling skin from a game bird's breast that has been removed using a tool in accordance with the present disclosure.
Figure 12B:
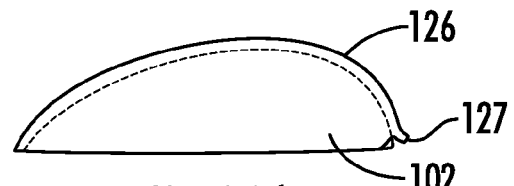
Figure 12C:
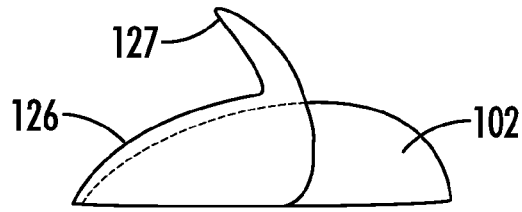
Figure 12D:
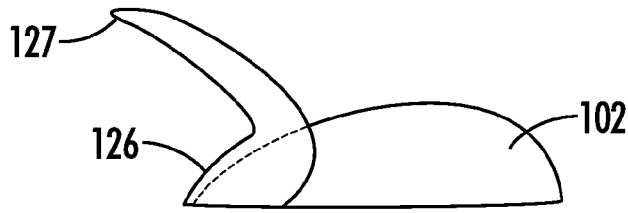
Figure 12E:
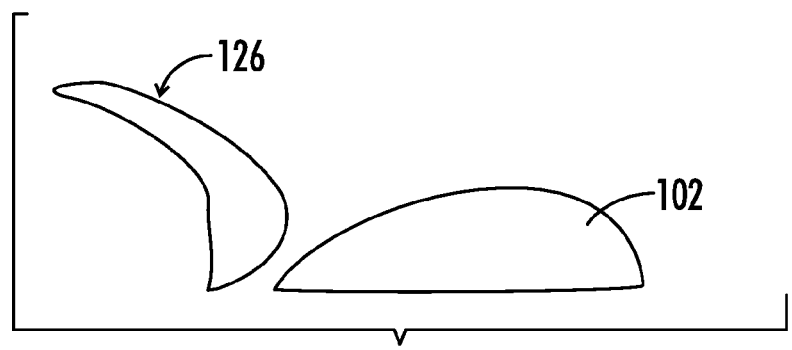

Referring now to FIGS. 9-11, in some embodiments, the present disclosure provides a method of removing meat from an animal using tool 10. The method includes providing a tool 10 in accordance with an embodiment of the above disclosure. Another step includes providing a meat sample 100 to be cut. In some embodiments, meat sample 100 includes a game bird. In one particular embodiment, the meat sample is a dove, quail, duck or pheasant. The breast region 102 generally includes a posterior region 116 and an anterior region 114. The anterior region 114 is located closer to the bird's head 115. In some embodiments, the meat sample 100 includes an entire bird. The bird can generally be held in a first hand 104 so that the breast region 102 on the bird abdomen is generally facing upward toward the user and the head 115 is extending away from the user.

The user may then insert stabilizer bar 16 into the bird's abdomen, starting at the posterior end 116, as illustrated generally in FIG. 10, and extending toward the anterior end 114. The stabilizer bar 16 in some embodiments can puncture directly into the abdomen tissue between the breast and the spine. In other embodiments, an incision 106 can be first formed in the breast region 102, and the stabilizer bar 16 can be inserted through the incision. Generally, when the stabilizer bar is inserted into the breast region 102, the first and second blades 22, 24 extend outwardly along opposite sides of the breast region as seen generally in FIG. 10. From this position, the user may squeeze the first and second handles as seen in FIG. 11, causing the first and second blades 22, 24 to move toward the stabilizer bar 16. The movement of the first and second blades 22, 24 relative to the stabilizer bar 16 causes a cutting effect on each side of the ribcage that severs the intact breast 102 from the bird.

After the breast is removed from the bird, the skin must be peeled from the breast before cooking. As seen in FIGS. 12A-12E, skin 126 may be pulled from the severed breast 102. A skin tab 127 can be formed on one end of the severed breast region 102, and the tab 127 can be peeled back from the breast region 102, resulting in a skinless severed breast region 102, seen in FIG. 12E.

Figure 13:
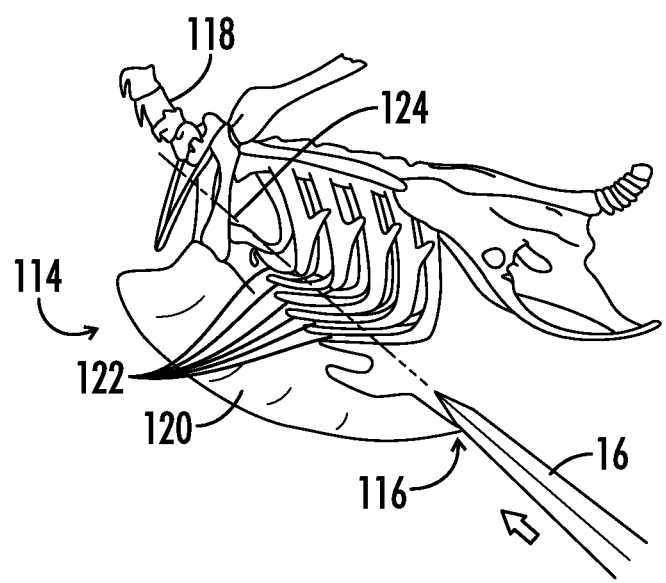
FIG. 13 illustrates an embodiment of one mode of operation for using a tool for removing meat from a bird in accordance with the present disclosure

Referring to FIG. 13, many game birds include a T-shaped bone referred to as a breastbone, or keel bone 120, protruding downward from the abdomen and bisecting the breast region 102 into halves. The desirable breast meat is usually attached to either side of the keel bone 120 in some game birds. The keel bone 120 generally includes meat on both lateral sides of the keel bone 120. In some embodiments, the present disclosure provides at least two modes for removing meat from the bird. In a first mode, the stabilizer bar 16 is inserted into the bird on the interior side of the keel bone 120, as illustrated in FIG. 13, such that the tip of the stabilizer bar 16 extends toward the anterior end of the bird's abdomen. From this position, the first and second blades approach the abdomen laterally from the sides, as seen in FIG. 10, when the handles are squeezed. When the first and second blades engage the bird, bones such as ribs 122, coracoids 124 or any additional tissue between the breast 102 and the bird abdomen are severed, thereby allowing the keel bone 120 and intact breast 102 to be removed cleanly from the bird abdomen.

Figure 4:
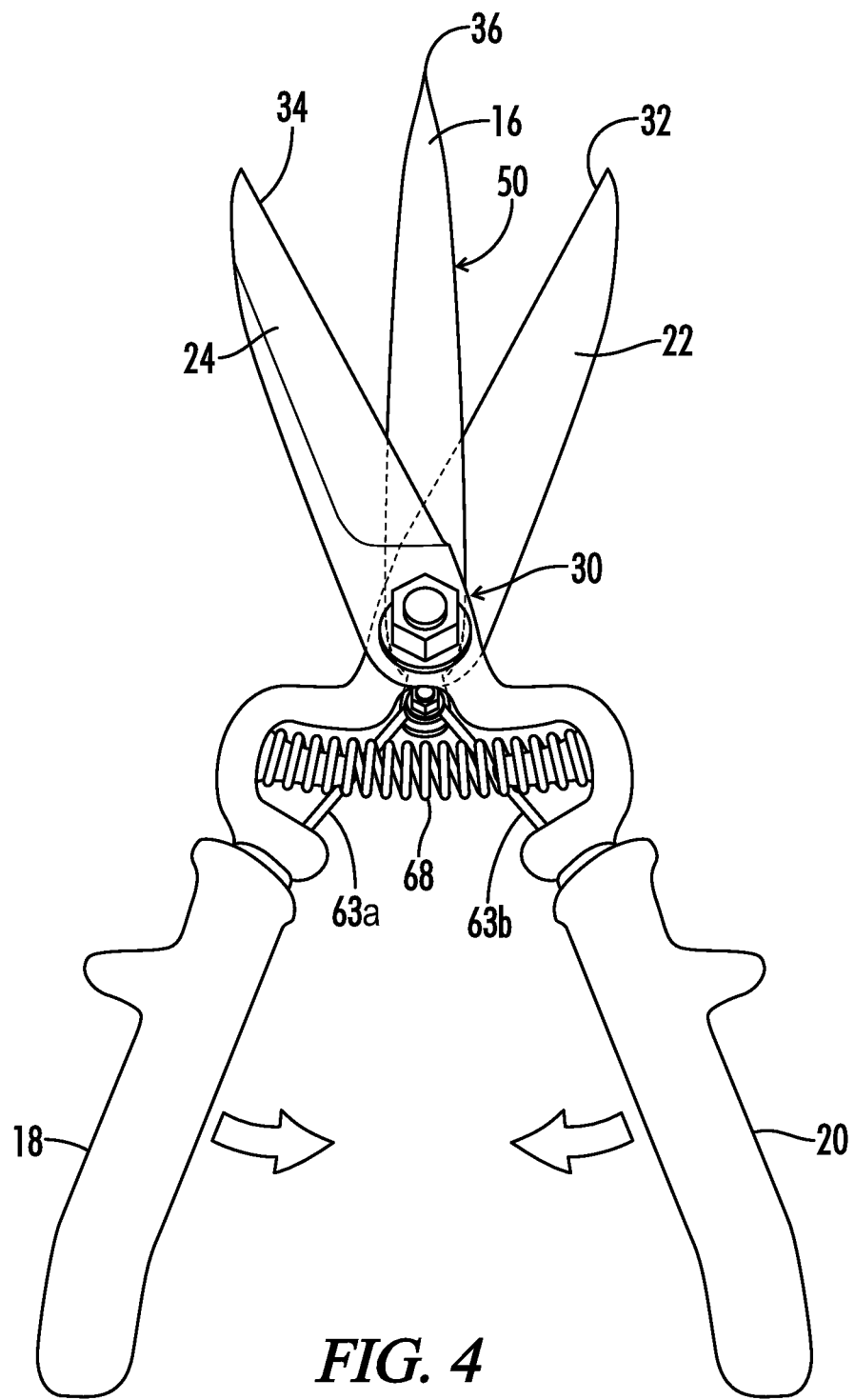
FIG. 4 illustrates a plan view of one embodiment of a game meat removal tool in an open position in accordance with the present disclosure.
Figure 5:
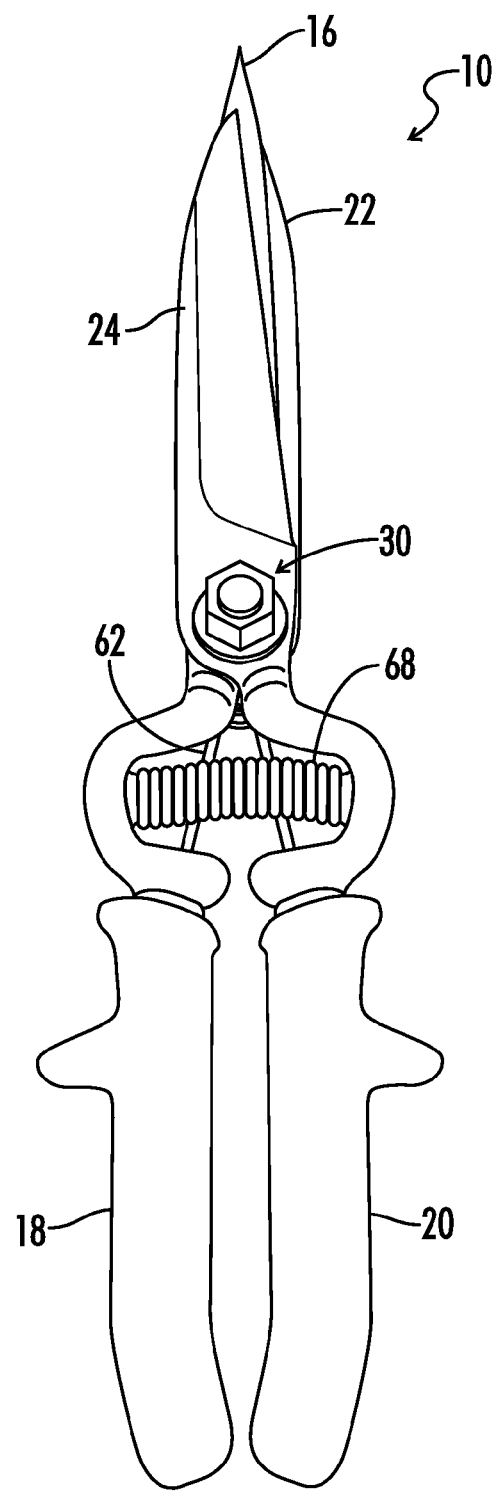
FIG. 5 illustrates a plan view of one embodiment of a game meat removal tool in a closed position in accordance with the present disclosure.

In some applications, the first and second blades 22, 24 may not release completely from the closed position, seen in FIG. 2, after the breast region 102 is severed from the bird abdomen. This can be due to tissue becoming lodged between the first and second blades and the stabilizer bar. In some embodiments, the present disclosure provides a compression spring 68, seen in FIG. 4-FIG. 6, positioned between first and second members 12, 14. The compression spring 68 can be a coil compression spring defining a hollow center void. In some embodiments, the first member 12 includes a first spring post 70, seen in FIG. 6, protruding from the first member 12 toward the second member 14. The first spring post 70 in some embodiments is disposed in the hollow center void of the compression spring 68. Also seen in FIG. 6, a second spring post 72 protrudes from the second member 14 generally toward the first member 12. The second spring post 72 is generally disposed in the opposite end of the hollow center void of the compression spring 68. Thus, the compression spring 68 can be housed on tool 10 between first and second spring posts 70, 72. In some embodiments, the compression spring 68 is held in place by a compression fit between first and second members 12, 14. Also seen in FIG. 6, in some embodiments an aperture post 76 protrudes from stabilizer bar 16. The aperture post 76 generally extends through the spring aperture 74 defined on spring 62. In this embodiment, the torsion spring aperture 74 is not disposed on the fastener 53. Rather the fastener 53 extends through the bar fastener slot 40 defined in stabilizer bar 16 and engages a threaded nut 60. Aperture post 76 protrudes from stabilizer bar 16 in some embodiments and includes an aperture post threaded end engaging a post nut 84. In some embodiments, a post washer 82 is disposed on the aperture post 76 between the post nut 84 and the spring 62.

Figure 6:
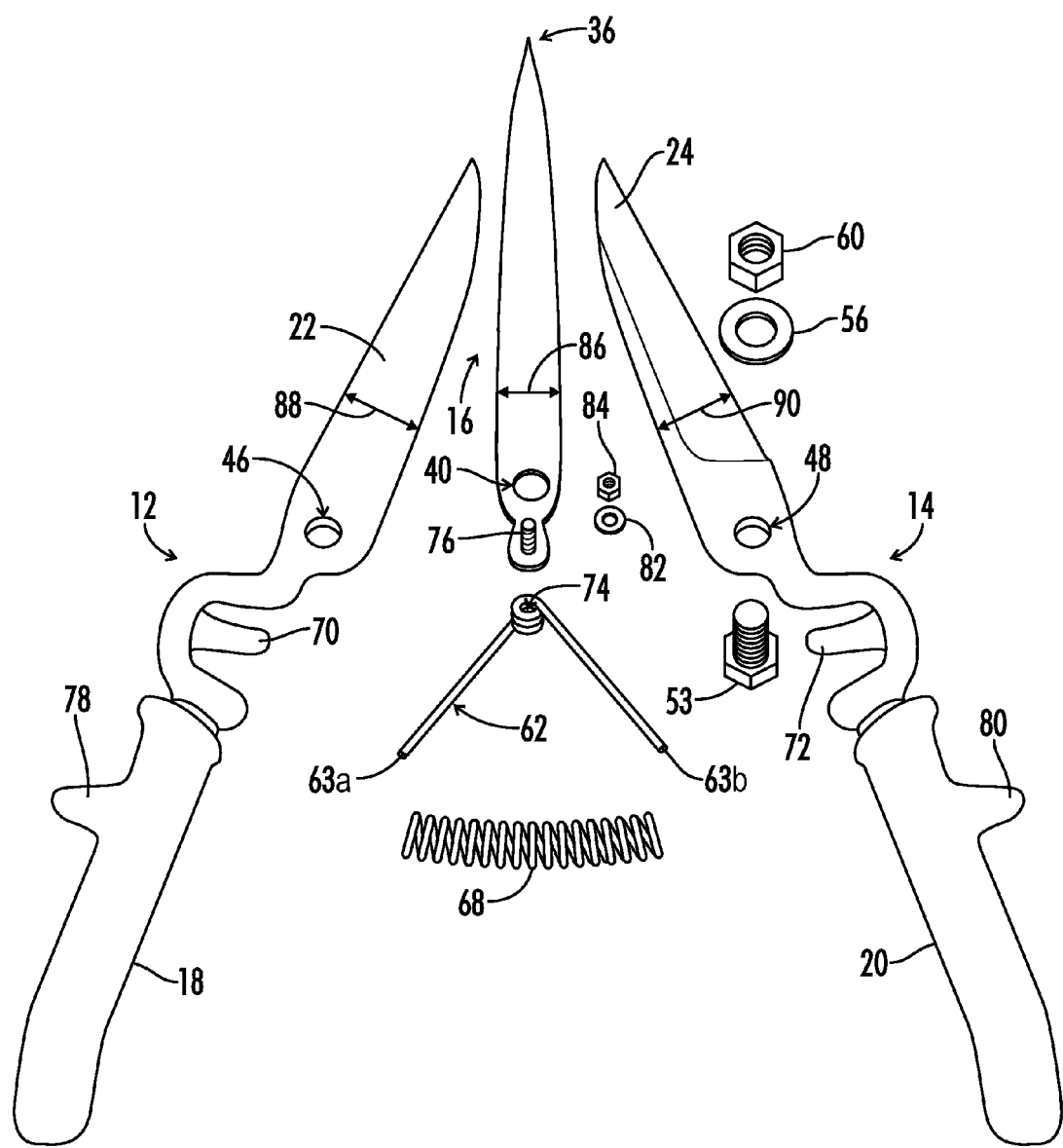
FIG. 6 illustrates an exploded view of one embodiment of a game meat removal tool in accordance with the present disclosure.

Referring further to FIG. 6, in some embodiments, spring 62 includes first and second torsion spring ends 63a, 63b. Each torsion spring end 63a, 63b can engage a corresponding member. For example, in one embodiment illustrated in FIG. 4, first torsion spring end 63a engages first member 12. Similarly, second torsion spring end 63b engages second member 14.

As seen in FIG. 7, in some embodiments, tool 10 includes an offset 26 between the blades, including stabilizer bar 16, and the handles. As such, the blades, including stabilizer bar 16, may be located in a different plane than the handles. As seen in FIG. 8, in other embodiments, the handles are located in substantially the same plane as the blades, including stabilizer bar 16.

Referring now to FIGS. 15-25, an additional embodiment of a meat removal tool 210 is illustrated. Meat removal tool 210 may alternatively be described as a bird debreaster, or a device for removing the breast meat from a bird. The device seen in FIGS. 15-25 is particularly suited for removing the breast from larger birds such as pheasants and ducks, but may also be used for smaller birds.

Figure 15:
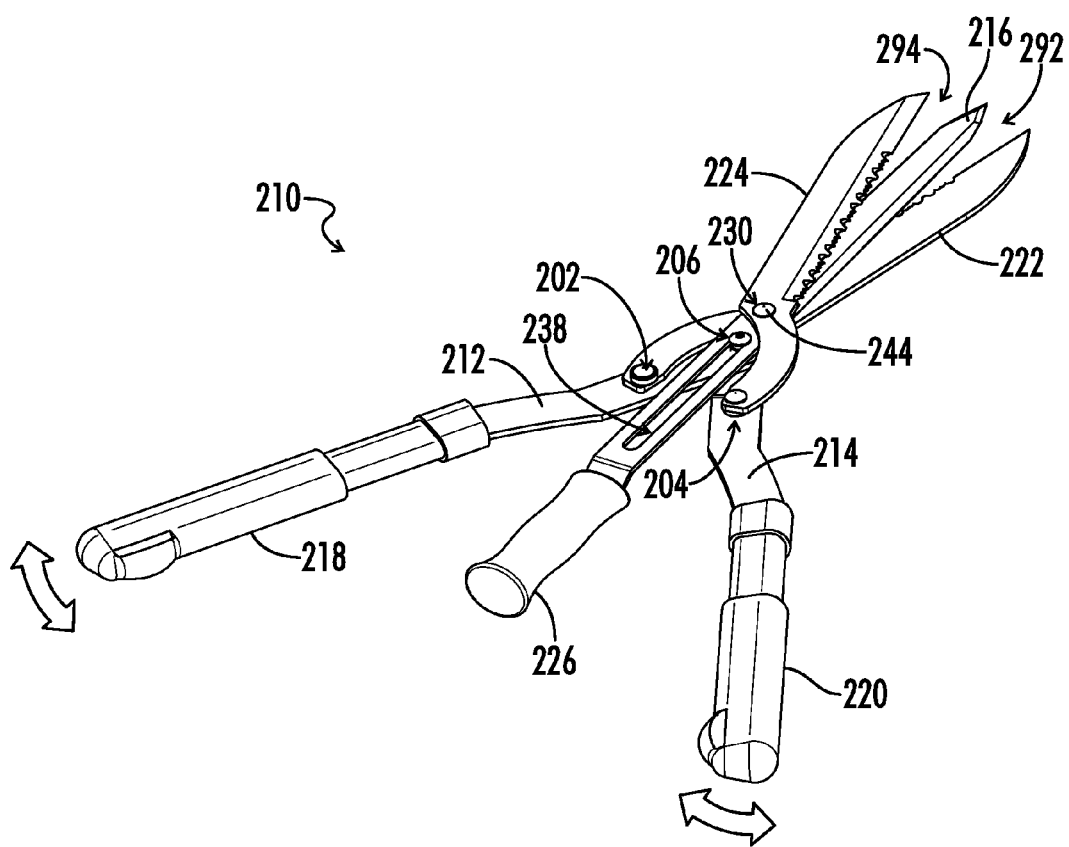
FIG. 15 illustrates a perspective view of an additional embodiment of a meat removal tool.

As seen in FIG. 15, meat removal tool 210 includes a center stabilizer bar 216. A first blade 222 is pivotally attached to the stabilizer bar 216 and protrudes generally on a first side of the stabilizer bar. A second blade 224 is also pivotally attached to the stabilizer bar 216 and protrudes generally on a second side of the stabilizer bar opposite first blade 222. A first opening 292 is defined between the first blade 222 and the stabilizer bar 216, and a second opening 294 is defined between the second blade 224 and the stabilizer bar 216. First blade 222 is also pivotally attached to second blade 224 at a pivoting joint 230.

Referring further to FIGS. 15-30, a second embodiment of an apparatus for removing a breast from a bird, or meat removal tool 210, is illustrated. Meat removal tool 210 generally includes a first blade 222 and a second blade 224 pivotally attached to the first blade 222. A stabilizer bar 216 is disposed between the first and second blades 222, 224. Stabilizer bar 216 is configured to secure a bird while the first and second blades are angularly moveable toward the stabilizer bar 216 for cutting the breast from the bird. Stabilizer bar 216 includes a base 208 and a distal end 236 extending away from the base, seen in FIG. 22.

A first handle 218 is pivotally attached to first blade 222 at a first blade joint 202, and a second handle 220 is pivotally attached to second blade 224 at a second blade joint 204. In some embodiments, first handle 218 includes a first handle bar 212 such as a metal bar, and second handle 220 includes a second handle bar 214 such as a metal bar. First and second handles 218, 220 are pivotally connected to each other at a pivotable handle joint 206, seen in FIG. 16, in some embodiments. Pivotable handle joint 206 is located at the distal end of each handle in some embodiments. During use, an operator may manipulate first and second handles 218, 220 to selectively move first and second blades 222, 224 toward or away from stabilizer bar.

Figure 26:
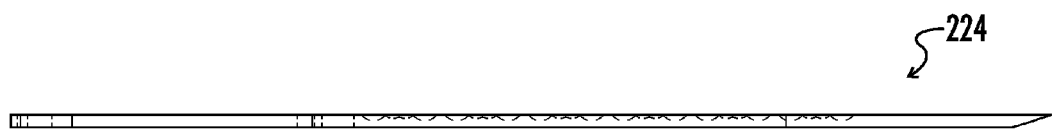
FIG. 26 illustrates a side view of an embodiment of a second blade.
Figure 27:
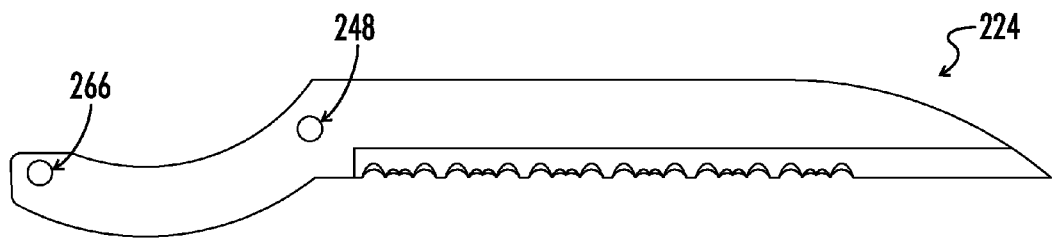
FIG. 27 illustrates a top view of the embodiment of a second blade of FIG. 26.

Also seen in FIG. 26, a stabilizer bar handle 226 is disposed on stabilizer bar 216. Stabilizer bar handle 226 may be integrally formed on base 208 of stabilizer bar 216. In alternative embodiments, stabilizer bar 216 may be a separate component that is attached to base 208 of stabilizer bar 216. During use, an operator may hold stabilizer bar handle 226 and force the distal end 236 of stabilizer bar 216 into a bird such that stabilizer bar 216 penetrates the bird's body underneath the keel bone. After the stabilizer bar 216 has penetrated the bird, the operator may then grasp first and second handles 218, 220 to manipulate first and second blades 222, 224 and cut the breast from the bird.

First and second blades 222, 224 are pivotally attached at a pivoting joint 230. Pivoting joint 230 provides a pivot point for first and second blades 222, 224 to pivot relative to each other for creating a repeatable scissoring action against a bird when the bird is positioned on stabilizer bar 216. In some embodiments, stabilizer bar 216 is also pivotally attached to first and second blades 222, 224 at pivoting joint 230. As such, first and second blades 222, 224 may also be pivotable relative to stabilizer bar 216.

Figure 22:
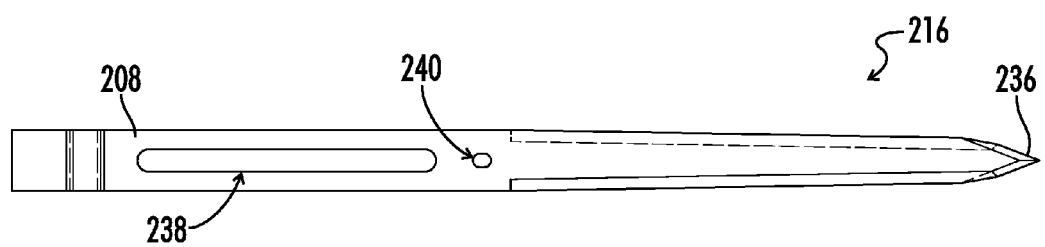
FIG. 22 illustrates a top view of an embodiment of a stabilizer bar.

As seen in FIG. 22, a bar fastener slot 240 is defined in stabilizer bar 216. Bar fastener slot 240 is a hole defined through stabilizer bar 216 in some embodiments. First blade 222, seen in FIG. 24 and FIG. 25 includes a first blade pivot 246 that may be aligned with bar fastener slot 240. In some embodiments, first blade pivot 246 is a first clearance hole defined through first blade 222. Similarly, second blade 224, seen in FIG. 26 and FIG. 27 includes a second blade pivot 248 that may also be aligned with bar fastener slot 240 and first blade pivot 246. Second blade pivot 248 includes a second clearance hole defined through second blade 224 in some embodiments.

Figure 16:
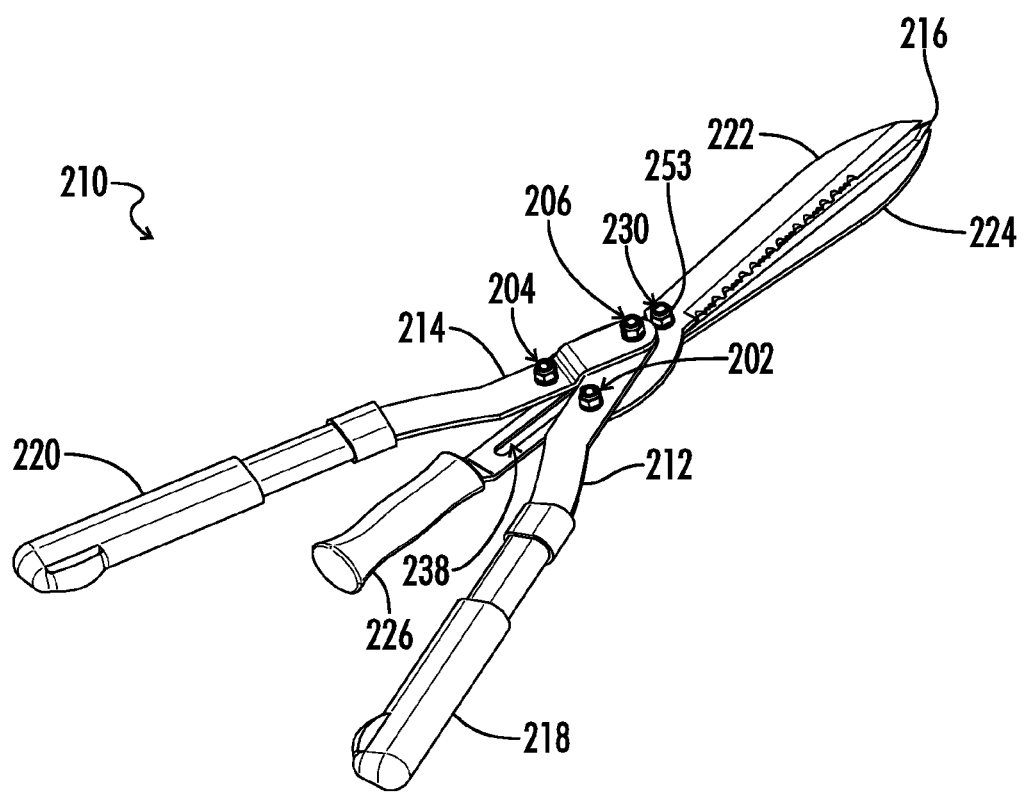
FIG. 16 illustrates a perspective view of the lower side of the embodiment of a meat removal tool of FIG. 15.

A fastener 253, seen in FIG. 16, may be used to join first and second blades 222, 224, wherein the fastener extends between first and second blades 222, 224 through bar fastener slot 240. Fastener 253 may extend through bar travel slot 240, and also through the first and second clearance holes in first and second blades 222, 224 in some embodiments. In some embodiments the fastener includes any suitable fastener such as a bolt, rivet or pivot pin. In alternative embodiments, first blade pivot 246 includes an integral pin that protrudes through bar fastener slot 240. In additional embodiments, second blade pivot 248 may also include an integral pin that protrudes through bar fastener slot 240. Bar fastener slot 240 may include a circular hole or an elongated opening in various embodiments.

Referring again to FIG. 15, in some embodiments, stabilizer bar 216 includes a bar travel slot 238 defined in base 208. Bar travel slot 238 generally defines a longitudinal opening that allows translation of a sliding member such as a fastener or pin. Bar travel slot 238 in this embodiment is positioned to receive a sliding member associated with first and second handles 218, 220. For example, as seen in FIG. 15 and FIGS. 17-20, a bar travel pin 244 may slide along bar travel slot 238. Bar travel pin 244 may include any type of suitable fastener such as a bolt, post or pin. In some embodiments, bar travel pin 244 includes a fastener such as a sliding bolt that forms handle joint 206 between first and second handles 218, 220. Bar travel pin 244 protrudes from handle joint 206 at least partially into bar travel slot 238. Bar travel slot 238 provides a guide for handle joint 206 when first and second handles 218, 220 are manipulated. When first and second handles are moved farther apart, bar travel pin 244 moves along bar travel slot 238 toward base 208 on stabilizer bar 216. When first and second handles are moved toward each other, bar travel pin 244 moves along bar travel slot 238 toward the distal end of stabilizer bar 216.

Figure 28:
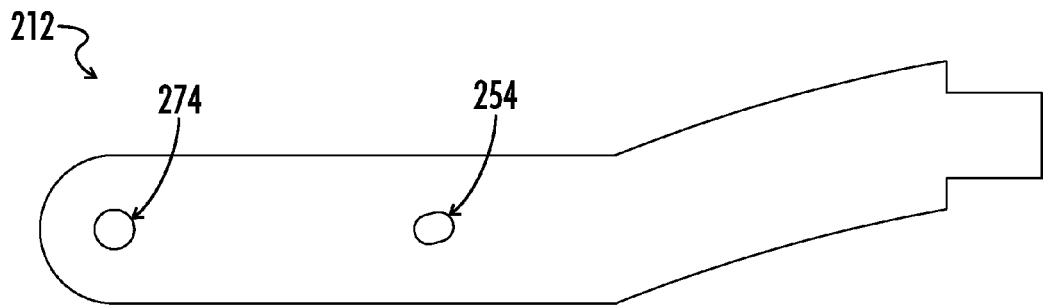
FIG. 28 illustrates a top view of an embodiment of a first handle bar of a first handle.
Figure 29:
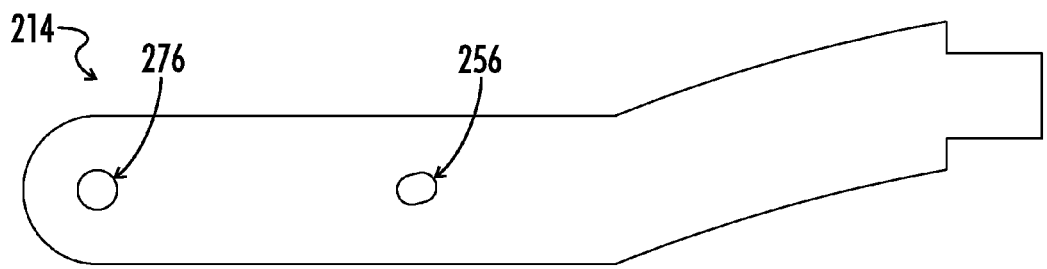
FIG. 29 illustrates a top view of an embodiment of a second handle bar of a second handle.
Figure 30:
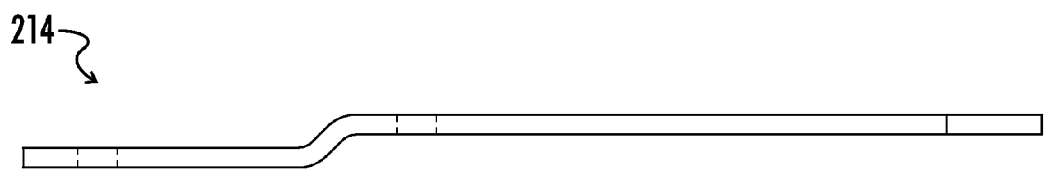
FIG. 30 illustrates a side view of the embodiment of a second handle bar of FIG. 29.

In some embodiments, travel pin 244 extends from first handle 218 into bar travel slot 238. In additional embodiments, travel pin 244 extends from first and second handles 218, 220 into bar travel slot 238. As seen in FIG. 28, first handle bar 212 includes a first joint hole 274. In some embodiments, travel pin 244 extends through first joint hole 274 and protrudes from first handle bar 212 on first handle 218 into bar travel slot 238. Additionally, as seen in FIG. 29, in some embodiments, second handle bar 214 on second handle 220 includes a second joint hole 276. In some embodiments, travel pin 244 extends through second joint hole 274.

Figure 17:
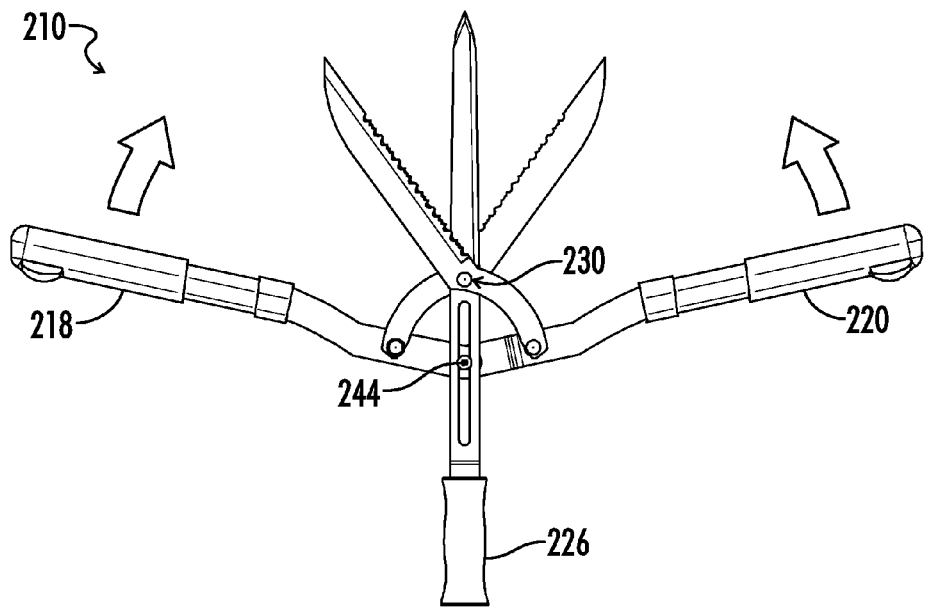
FIG. 17 illustrates a top view of the embodiment of a meat removal tool of FIG. 15 with first and second handles rotating away from the stabilizer bar handle.
Figure 18:
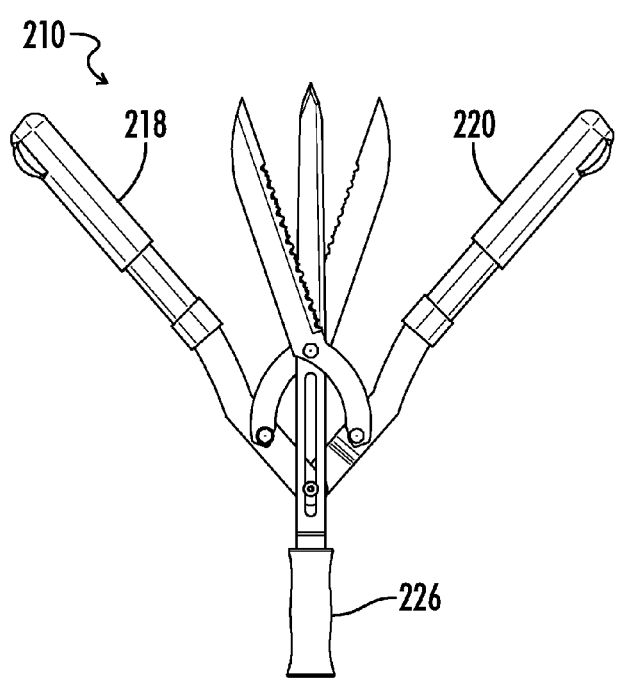
FIG. 18 illustrates a top view of the embodiment of a meat removal tool of FIG. 17 showing the first and second handles moving further away from stabilizer bar handle toward a storage position.
Figure 19:
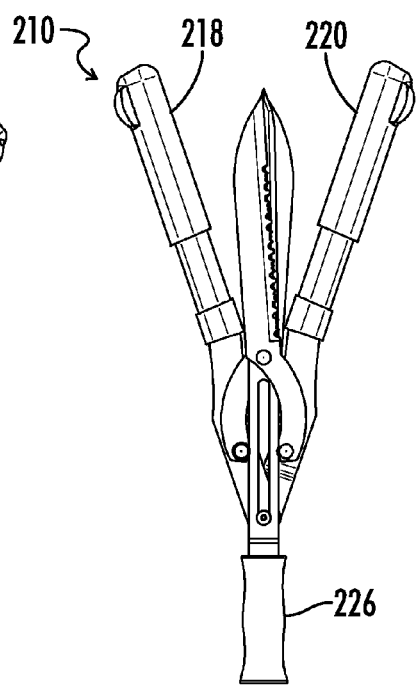
FIG. 19 illustrates a top view of the embodiment of a meat removal tool of FIG. 15 in a storage position.
Figure 20:
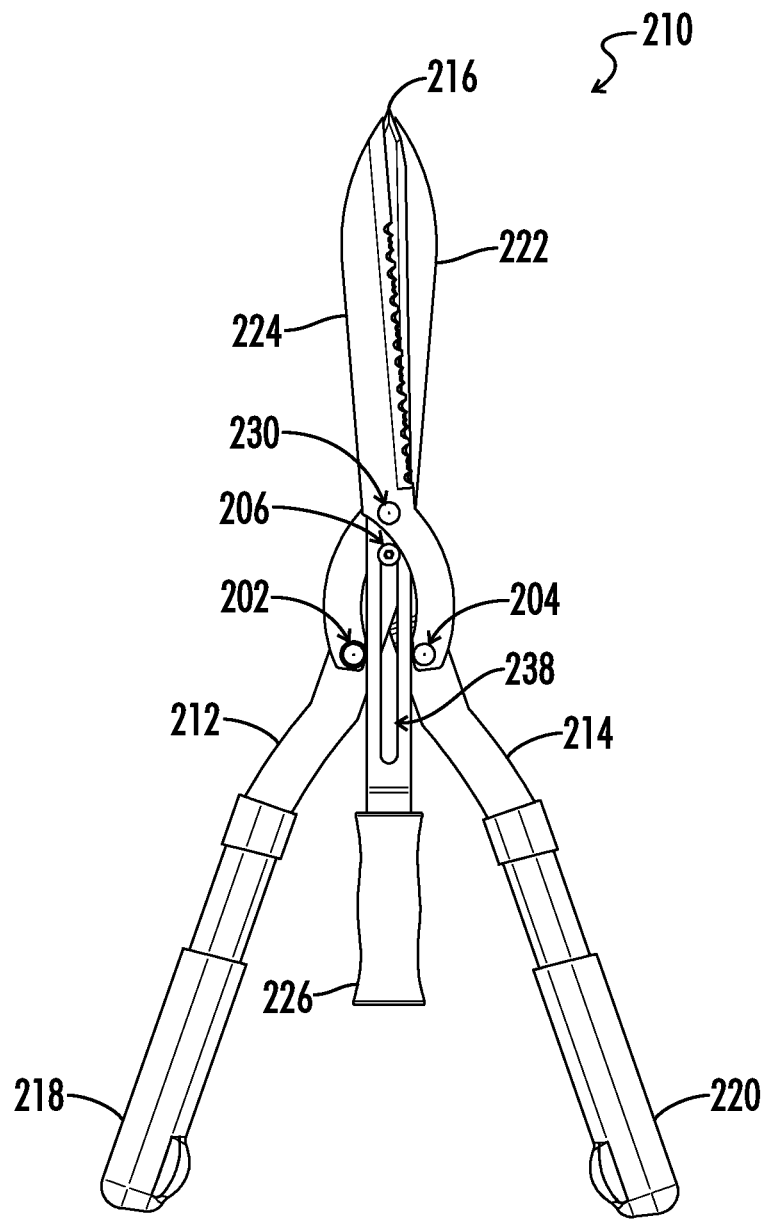
FIG. 20 illustrates a top view of the embodiment of a meat removal tool of FIG. 15 with the blades closed in a cutting position.
Figure 21:
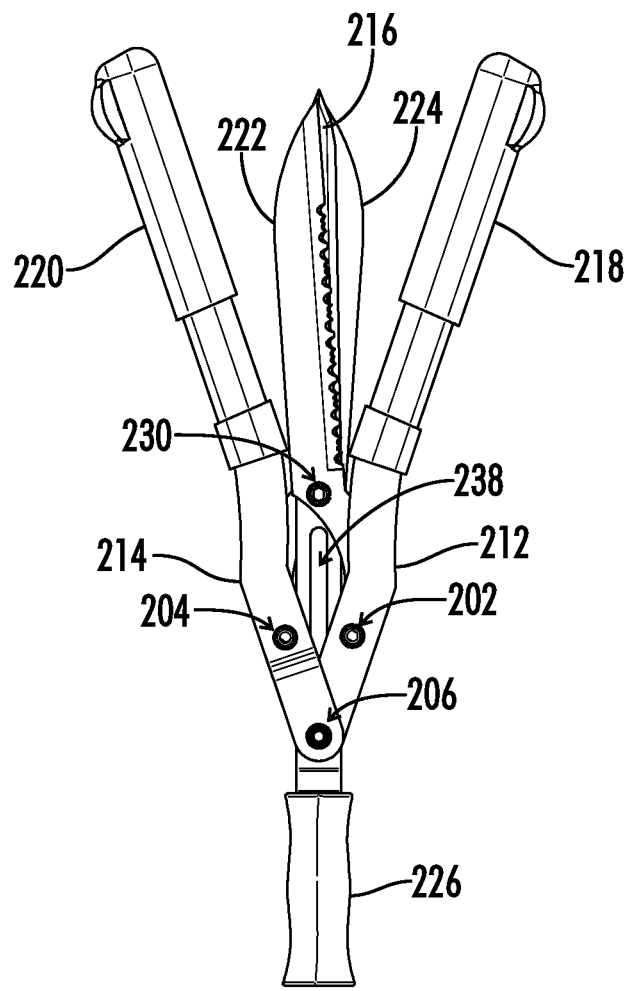
FIG. 21 illustrates a bottom view of the embodiment of a meat removal tool of FIG. 15 with the blades closed in a storage position.

In some applications, meat removal 210 includes a cutting position, seen in FIG. 20, and a storage position seen in FIG. 21. From the cutting position, first and second handles 218, 220 may be manipulated to move first and second blades 222, 224 for cutting meat. In the storage position, first and second handles 218, 220 are pivoted forward toward the distal end of stabilizer bar 216. In this position, the blades may not be operated for cutting. As seen in FIGS. 17-19, an operator may pivot first and second handles 218, 220 away from each other about pivoting joint 230 to move from the cutting position to the storage position. In the storage position, the distal ends of first and second handles 218, 220 extend beyond the distal end of stabilizer bar 216 in some embodiments. This may be useful to prevent the sharpened end of stabilizer bar 216 from causing damage or injury.

Figure 23:
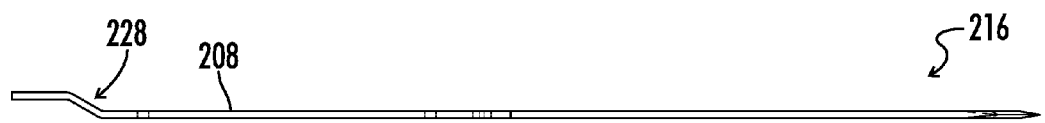
FIG. 23 illustrates a side view of the embodiment of a stabilizer bar of FIG. 22.
Figure 24:
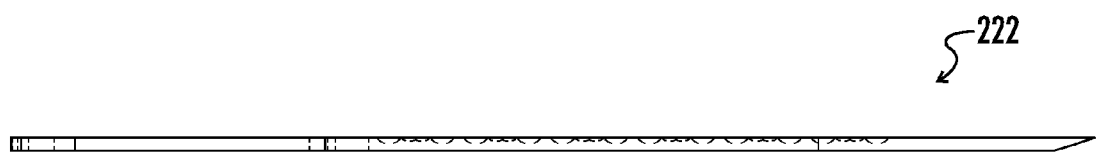
FIG. 24 illustrates a side view of an embodiment of a first blade.
Figure 25:
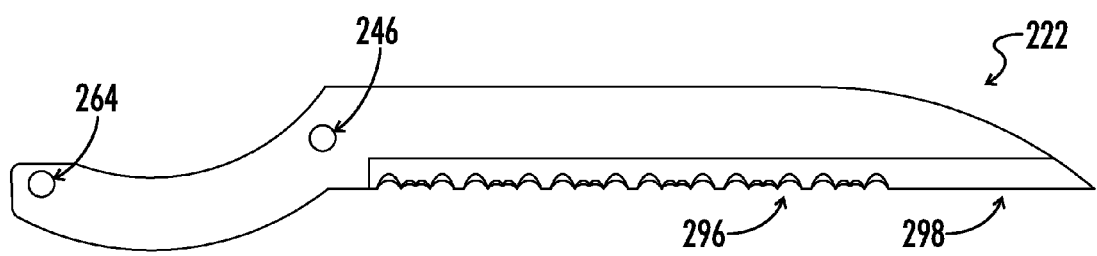
FIG. 25 illustrates a top view of the embodiment of a first blade of FIG. 24.

As seen in FIG. 23, in some embodiments, stabilizer bar 216 includes an offset region 228 on base 208. Referring further to FIGS. 24 and 25, in some embodiments, first blade 222 includes a serrated sharpened region 296 and a smooth sharpened region 298. Serrated sharpened region 296 provides enhanced gripping and cutting action against a bird when the bird is installed on stabilizer bar 216.

Also seen in FIG. 28, first handle bar 212 on first handle 218 includes a first handle bar hole 254 positioned to align with first blade joint 202. A fastener may extend through both first handle bar hole 254 and first blade hole 264 to provide a pivotable linkage between first handle 218, and particularly first handle member 212, and first blade 222. This pivotable linkage provides improved mechanical advantage in some embodiments for enhanced cutting action.

Similarly, in some embodiments, second handle bar 214 on second handle 220 includes a second handle bar hole 256. Second handle bar hole 256 is generally aligned with second blade hole 266 in second blade 224 at second blade joint 204. A fastener may extend through second handle bar hole 256 and second blade hole 266 in second blade 224. Because second handle 220 is pivotally linked to second blade 224, improved mechanical advantage may be achieved for enhanced cutting action.

During use, an operator typically grips the stabilizer bar handle 226 and forces stabilizer bar 216 into the abdomen of a bird to be debreasted. The stabilizer bar 216 may be inserted under the keel bone. The operator would then grasp first and second handles 218, 220 and apply a scissoring motion to force first and second blades 222, 224 angularly toward and away from stabilizer bar 216. The movement of first and second blades 222, 224 will cut the breast from the bird. The detached breast and intact keel bone may then be removed from the stabilizer bar 216. During the cutting procedure, the bird may slide slightly toward the distal end of stabilizer bar 216. This can be counteracted by pressing the distal end of the stabilizer bar against a surface while cutting. The bird is considered to remain secured on the stabilizer bar 216 even if the bird moves slightly during the cutting process.

Thus, it is seen that the apparatus and methods disclosed herein achieve the ends and advantages previously mentioned. Numerous changes in the arrangement and construction of the parts and steps will be readily apparent to those skilled in the art, and such changes are encompassed within the scope and spirit of the present disclosure.

What is claimed is:

1. An apparatus for removing a breast from a bird, comprising:
   a first blade;
   a first handle pivotally attached to the first blade;
   a second blade;
   a second handle pivotally attached to the second blade;
   a stabilizer bar disposed between the first and second blades; and
   a stabilizer bar handle disposed on the stabilizer bar, the stabilizer bar handle positioned between the first and second handles.

2. The apparatus of claim 1, wherein the first blade, second blade and stabilizer bar are pivotally joined at a pivoting joint.

3. The apparatus of claim 2, wherein the stabilizer bar is configured to secure the bird while the first and second blades are angularly moveable toward the stabilizer bar for cutting the breast from the bird.

4. The apparatus of claim 3, wherein movement of the first and second handles toward each other causes the first and second blades to move toward the stabilizer bar.

5. The apparatus of claim 1, further comprising:
   the stabilizer bar including a base and a distal end extending from the base, the base including a bar fastener slot; and
   a fastener pivotally joining the first and second blades, the fastener extending through the bar fastener slot.

6. The apparatus of claim 1, further comprising:
   the stabilizer bar including a base and a distal end extending from the base, the base including a bar travel slot; and
   a travel pin protruding from the first handle into the bar travel slot, the travel pin forming a pivotable joint between the first and second handles.

7. The apparatus of claim 6, wherein:
   the first and second handles are pivotally joined at a pivoting joint, and
   the pivoting joint is aligned with the travel pin.

8. The apparatus of claim 7, wherein the travel pin is moveable along the bar travel slot when the first and second handles are angularly moved relative to each other.

9. An apparatus for removing a breast from a bird, comprising:
   a first blade;
   a first handle pivotally attached to the first blade;
   a second blade pivotally attached to the first blade;
   a second handle pivotally attached to the second blade;
   a stabilizer bar disposed between the first and second blades, the stabilizer bar defining a bar travel slot; and
   a travel pin extending from the first handle into the bar travel slot,
   wherein the travel pin is moveable in the bar travel slot.

10. The apparatus of claim 9, wherein the stabilizer bar is configured to secure the bird while the first and second blades are angularly moveable toward the stabilizer bar for cutting the breast from the bird.

11. The apparatus of claim 9, further comprising a stabilizer bar handle disposed on the stabilizer bar between the first and second handles.

12. The apparatus of claim 11, further comprising:
   a bar fastener slot defined in the stabilizer bar; and
   a fastener pivotally joining the first and second blades, the fastener extending through the bar fastener slot.

13. The apparatus of claim 9, wherein the travel pin forms a pivoting joint between the first and second handles.

* * * * *